United States Patent [19]

Heath

[11] Patent Number: 4,710,886

[45] Date of Patent: Dec. 1, 1987

[54] TABLE DRIVEN PRINT FORMATTING

[75] Inventor: Allen Webster Heath, Cedar Park, Tex.

[73] Assignee: International Business Machines Corporation, Armonk, N.Y.

[21] Appl. No.: 664,181

[22] Filed: Oct. 24, 1984

[51] Int. Cl.[4] .................. G06F 3/09; G06F 15/02; B41J 5/30

[52] U.S. Cl. .................... 364/519; 364/523; 364/900; 400/3; 400/70; 400/279

[58] Field of Search ............ 364/200, 900, 519, 523; 400/3, 4, 5, 12, 17, 22, 61, 62, 65, 70, 279

[56] References Cited

U.S. PATENT DOCUMENTS

| | | | |
|---|---|---|---|
| 4,084,680 | 4/1978 | Deetz | 400/62 X |
| 4,086,660 | 4/1978 | McBride | 364/900 |
| 4,282,583 | 8/1981 | Khan et al. | 364/900 |
| 4,359,286 | 11/1982 | Barnes et al. | 400/70 |
| 4,381,553 | 4/1983 | Ferguson | 364/519 |
| 4,467,321 | 8/1984 | Volnak | 340/365 VL |
| 4,500,216 | 2/1985 | Demonte et al. | 400/12 |
| 4,575,813 | 3/1986 | Bartlett et al. | 364/900 |
| 4,587,608 | 5/1986 | Kishi et al. | 364/191 |
| 4,587,628 | 5/1986 | Archer et al. | 364/900 |

OTHER PUBLICATIONS

Gutzmann: The Rapid-Printer Typesetting Program Scriptor Applied Informatics (German) Jun. 1979.
Moore: IBM Technical Disclosure Bulletin, Uniform word underscoring in proportionality spared printer, vol. 22, No. 6, Nov. 1979, pp. 2178-2182.
Fleek et al.: Character Generator IBM Tech. Incl. Bull. vol. 21, No. 6, Nov. 1978, p. 2289.
Franklin: Printing underscore characters and storing representations thereof. IBM Tech. Discl. Bull., vol. 21, No. 6, Nov. 1978, pp. 2392/93 and 400/17.
McCray: Control System for Strike Over Character Misalignment. IBM Tech. Discl. Bull., vol. 21, No. 6, Nov. 1978, pp. 2390/91 and 400/17.
Reference Manual, Display Write 2 Version 1.10 . IBM Corporation, pp. 237-238.
Softword Systems, Inc., Multimate Professional Word Processing for the IBM PC, 1983, pp. 4-25-4-47, C-1-- C-6.

Primary Examiner—Felix D. Gruber
Attorney, Agent, or Firm—James A. Kunkle; D. H. Lefeve; J. Jancin, Jr.

[57] ABSTRACT

A table driven print formatting system that accepts a text data stream including individual text commands and produces a printable data stream including individual print commands. The formatting system uses the text data in combination with printer status data to select subsection entries from a printer description table. The subsection entries include specific print command subsections each having print commands that can be placed immediately into the printable data stream upon selection. The table also includes general print command subsections which each have printer description data and a general print command shell. When a general print command subsection entry is selected, the printer description data is used in combination with the text data to calculate a parameter for inserting into the general shell thereby producing a print command for placing in the printable data stream. The printer description table also uses a unique entry indexing scheme that minimizes storage requirements for the table.

14 Claims, 9 Drawing Figures

TABLE DRIVEN PRINT FORMATTING

TECHNICAL FIELD

The present invention relates to computer controlled document printing.

BACKGROUND

To date, computer-based word processing systems have been dedicated primarily to text processing and have had limited, if any, data processing capabilities. These word processing systems have been marketed as complete systems typically including a keyboard, display, processing unit, magnetic media storage device, document printer, and software. Since these systems were dedicated machines sold as a total package of hardware and software, the printer access method (i.e., the set of programs for translating a text data stream into a printable data stream) could be relatively simple and did not need to have the flexibility necessary to allow the processing unit to print documents on printers other than the printer with which the processing unit was initially sold.

The modern trend in consumer preference has been away from the dedicated word processing systems and toward the small, general purpose business computers capable of both text and data processing. Since data processing places few special requirements on a printer, many diverse printers have become available. In addition, purchasers of these small business computers often purchase the processing unit from one source and the printer from another source. While mixing product sources may cause no problems in the field of data processing, the source mismatch may cause problems when complex text processing is attempted. For example, complex text processing may require different line pitch (e.g., 5.3, 6, 8, or 24 lines per inch), different line spacing (e.g., 0.5, 1, 1.5, 2, or 3 lines), different character pitch (e.g., 8.55, 10, 12 characters per inch, or proportional spacing), and advanced text functions (e.g., superscript, subscript, underscore, or boldface), and these functions may be required at different times during the printing of a single text document.

To complicate the problem, there is little, if any, standardization of printer commands for these complex text functions. Even printers that claim to be replacement or equivalent printers are often different when performing the more subtle of these complex functions.

One known solution to this problem of processing unit/printer mismatch has been to provide customized print formatting routines for each printer that is to be supported. For example, the IBM text processing program Displaywrite 2 has support for four printers (IBM graphics printer, IBM matrix printer, IBM 5218 printer, and NEC 3550 printer). With this customized printer support, the text program sends the correct print commands to the destination printer to perform the intended function. This solution has two principal failures. First, only a limited number of printers can be supported, and second, even though some printers claim to be replacement or equivalent printers, printer function of so-called equivalent printers often varies in response to the same print command.

Another known solution is to provide a simple translation table that is changeable by the system user. This solution transforms a text data stream into a printable data stream by looking in a table for individual print commands corresponding to individual text commands in the text data stream. The individual print command entries in the table are changeable by the user to allow different print commands to be produced for a given text command depending on the printer supported. This solution has several limitations including requiring a fixed amount of storage for the translation table regardless of the complexity of the supported printer. With this fixed length table, a given text command always addresses the same entry in the table. In order for the table to support complex function printers, the table must be large (e.g., 2k bytes of memory). If a printer does not support the function indicated by the print command represented by the addressed entry, the entry is set to zero but continues to occupy a position in storage. This fixed length table is overkill for some simple function printers, thereby wasting valuable storage space, but for more complex printers, the fixed table may prove inadequate. In addition, the simple table approach requires a separate table entry for each anticipated printer function. For example, in order to support five different print pitches, the table would require five separate table entries. This replication also represents wasted storage space.

SUMMARY OF THE INVENTION

The present invention solves the aforementioned problems and avoids the pitfalls of the previous solutions by providing a generalized print formatter that interprets information from a user supplied table of printer description data. This table contains the necessary commands to invoke a set of text processing functions within the particular printer. In addition, the table contains instructions on how to dynamically construct print commands needed. Individual table entries describe a general print command shell format for a general printer function. During printable data stream formatting, the present invention selects a particular print command shell and then follows rules stored in the table to calculate necessary parameters for insertion in the shell. For example, to support five different print pitches, the present invention requires only one general pitch change print command shell to be stored in the printer description table. When the text data stream requests a specific pitch change, the general pitch change print command shell is selected and a parameter (or parameters) corresponding to the specific requested pitch change is calculated and inserted into the shell to produce a dynamically created print command for the specific pitch change. Where a particular function is not defined in the set of possible print commands, the print formatter tries alternatives that emulate the desired function by application of several print commands that are defined.

In addition, the printer description table of the present invention employs a unique entry indexing scheme whereby the table includes headers that point to the location of individual table entries. When a table entry is added, an index is added to the header to facilitate locating the added entry in the future. If a particular function is not supported by the printer, for example, bold or underscore, the header contains a null pointer for the memory address of the table entry and no print command is stored for these unsupported functions. Therefore, in direct contrast with the background art, there need be no print commands stored in the table if the printer supported by the table does not use those commands. Thus, the printer description table is of variable length depending on the complexity of the supported printer.

Using general print command shells with parameters that are dynamically calculable in combination with an indexed table greatly reduces the storage requirements of the present data stream formatting invention while, at the same time, greatly increasing the flexibility of printable data stream formatting.

It is therefore a primary object of the invention to provide a highly flexible printable data stream formatter.

Another object of the invention is to minimize the storage space required by a printer description table in a printable data system formatter.

Other objects, features, advantages, and extensions of the present invention will become evident during the following detailed description with reference to the drawing.

DETAILED DESCRIPTION

Figure 1:
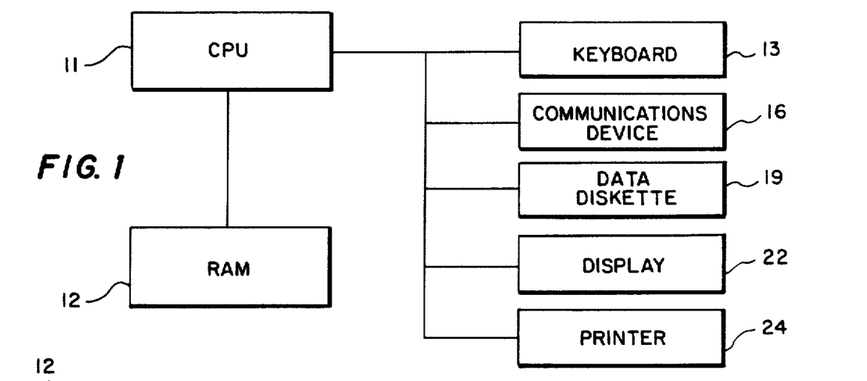
FIG. 1 is a block diagram of of a system embodying the present invention.
Figure 3A:
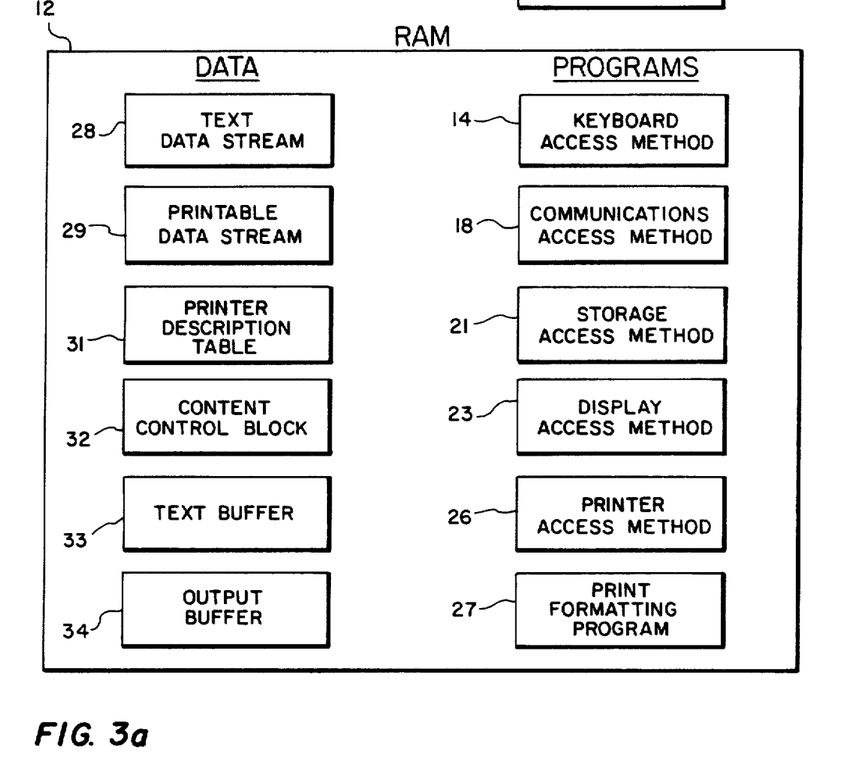
FIG. 3A is a block diagram of the programs and key storage areas within the RAM.

Referring to FIGS. 1 and 3a, FIG. 1 is block diagram of the system in which the subject invention is preferably embodied. The elements of the system of FIG. 1 are presented by way of illustration and not limitation. A specific example of such a system is the IBM Personal Computer manufactured by International Business Machines Corporation.

The system is based on central processing unit 11 which may be any of several commercially available microprocessors. The system also contains a random access memory (RAM) 12 for storing information in the form of data as well as programs for manipulating the data under control of unit 11.

The programs and data may be loaded into RAM 12 from several possible sources. For example, an operator could enter this information via keyboard device 13 through keyboard access method 14 under control of processing unit 11. In a like manner, information could enter RAM 12 from communications device 16.

Communications device 16 is interfaced to RAM 12 by communications access method 18 under control of central processing unit 11. In addition, information in the form of data or programs or both could be transferred from data diskette device 19 by storage access method 21 to RAM 12 under control of processor unit 11.

Information may also be output from RAM 12 to several different devices. For example, information can flow from RAM 12 to data diskette device 19 or to communications device 16 through access methods 21 and 18, respectively. Information may also be displayed on display device 22 by display access method 23 under control of processing unit 11. Display device 22 may be, for example, a cathode ray tube or similar ephemeral image display. Finally, information can be printed by printer 24 via printer access method 26 after being formatted by print formatting program 27.

Print formatting program 27 is a set of program code that accepts a text data stream and which translates the text data stream into a printable data stream. It should be noted that the printable data stream can be sent directly to printer 24 or it can be stored on diskette device 19, transmitted by communications device 16, or even displayed on display device 22.

Although each access method 14, 18, 21, 23, and 26, are depicted in FIG. 3a to be in the RAM 12, it will be understood by those skilled in the art that one or more of the access methods or any combination thereof, may actually reside external to RAM 12. Alternatively, the access methods could reside in non-volatile read only storage (not shown).

Figure 2:
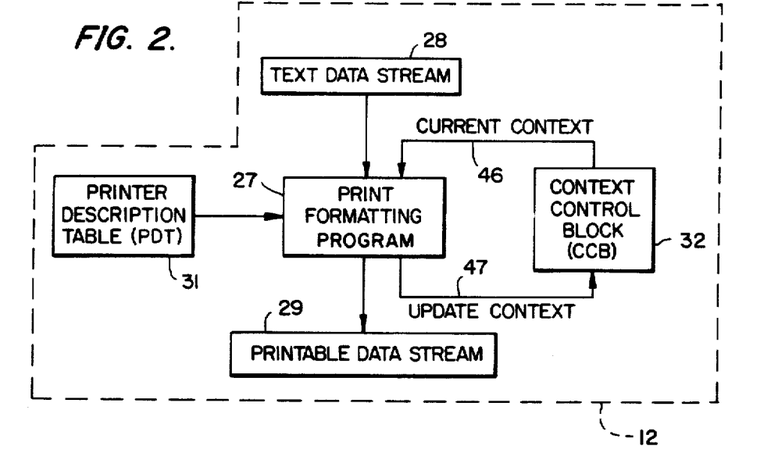
FIG. 2 is a general flow chart of the operation of a print formatting program according to the present invention.
Figure 3B:
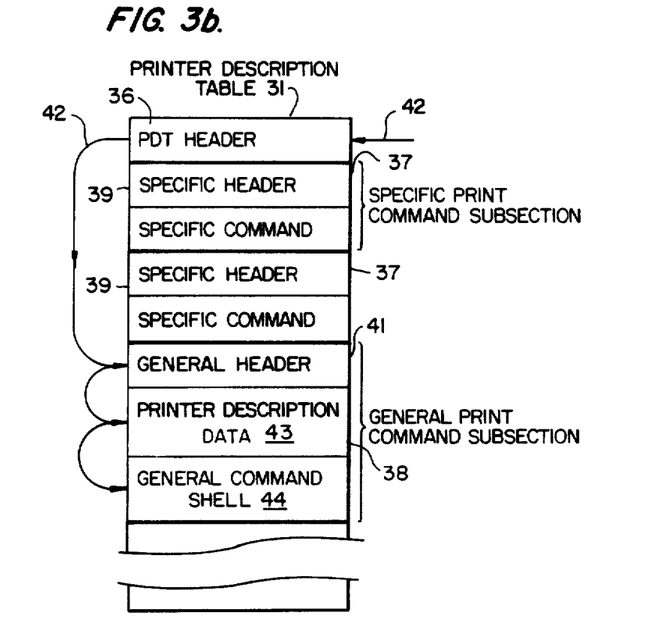
FIG. 3B is a diagram of the printer description table within the RAM.

Referring to FIGS. 2, 3a and 3b, the general flow of data through formatting program 27 is shown. The input to program 27 takes the form of text data stream 28 which consists of individual text commands representative of, for example, a document. Text data stream 28, or at least the portion of stream 28 that is presently being formatted, is typically stored in text buffer 33 which occupies a portion of RAM 12. The output of program 27 is a printable data stream 29 which consists of individual print commands to be sent to a printer to effect printing the document. Printable data stream 29 shown in RAM 12 may reside in output buffer 34 which also occupies a portion of RAM 12.

When constructing printable data stream 29 from text data stream 28, program 27 uses information supplied by printer description table (PDT) 31 and context control block (CCB) 32. Both PDT 31 and CCB 32 occupy portions of RAM 12.

An exemplary configuration for printer description table 31 is shown in FIG. 3b. Table 31 generally includes a table header 36 and several subsections of which there are two types: specific subsections 37 and general subsections 38. Although FIG. 3b only shows two specific subsections 37 and one general subsection 38, it is to be understood that PDT 31 may contain any number of both types of subsections. Table header 36 contains pointers that specify the memory locations of subsection headers 39 and 41. Specific section headers 39 contain pointers that specify the locations of each one of the specific print commands located within that specific subsection 37.

In a like manner, general section headers 41 contain pointers to the memory locations of each of the printer description data and the corresponding general print command shell both located within that general subsection.

The specific print command subsections include, for example, the print commands for effecting form feed; begin/end bold printing; begin/end quality printing mode; begin/end underscore and so forth. Within each specific print command subsection 37 are a plurality of specific print commands. For example, the specific subsection for begin/end bold printing may contain the three print commands: begin bold, end bold, and move fixed horizontal distance. These specific print commands require no modification and, when accessed by print formatting program 27, are simply placed directly in printable data stream 29.

In contrast, the general print command subsections include, for example, print commands for effecting changes in line pitch or character pitch. The general print commands located within each of the general subsections are termed "shells" because they contain one or more unspecified parameters that are calculated dynamically and inserted into a shell to construct a complete print command. The parameter or parameters to be inserted into a selected shell are calculated by using the text data stream and the printer description data stored in the printer description data portion of the general subsection of PDT 31 corresponding to the selected shell.

For example, to change vertical line pitch, the IBM Personal Computer Graphics Printer requires a hexadecimal print command of 1B 33 XX where XX is a parameter determinative of the number of fundamental vertical steps per index (a fundamental vertical step being the minimum vertical movement performable by the printer). The printer description data corresponding to the general print command shell 1B 33 XX includes: the length of a fundamental vertical step (1/216 inch); the maximum number of fundamental vertical steps possible for a single index (255); the offset that must be added to or subtracted from the parameter (0); the format of the parameter (binary), and the location of the parameter within the shell (third hexadecimal nibble). This printer description data is then used in combination with the requested line pitch derived from the operative text data stream to calculate the parameter to be inserted into the general print command shell to form a print command. Details of the coding for a specific example are given below.

Here it should be noted that for a different general print command shell, different printer description data may be required. In other words, the printer description data may vary from one general subsection to another.

Printer description table 31 is constructed by the system operator when the operator is initially setting up the system. The support documentation for the system printer will typically describe the individual print commands required by the printer to execute given functions. During system set up, the operator fills PDT 31 with specific print commands, general print commands, and the printer description data corresponding to each of the general print commands. As table 31 is being built, headers 36, 39, and 41 keep track of the memory locations of the individual entries. If a printer does not support a particular subsection or print command, the appropriate table header will contain a null memory pointer for that print command and no space is allocated for that subsection or print command. For example, if a particular subsection does not exist at all, table header 36 would contain a null memory pointer for the non-existent subsection. However, if a subsection exists but a particular print command within that subsection does not exist, table header 36 would contain a memory pointer to the subsection header (e.g., 39), and the subsection header would contain a null memory pointer for the non-existent print command. By this means, a completed printer description table is of an optimum size for the supported printer.

If a printer does not recognize a particular print command, or if the printer may misinterpret a particular print command in a given context, the table allows several alternatives to force the printer to perform the desired function.

For example, if a printer does not recognize the print command for "begin automatic underscore", the underscore subsection of PDT 31 would reflect an emulation of underscoring. One possible emulation of underscore would be to print the entire line, perform a carriage return without a line index, and then reprint the line using underscore characters at the desired positions with space characters elsewhere.

An example of a printer that may misinterpret a particular print command is found in printers using bi-directional logic seeking heads having software control that ignores white spaces in an attempt to reduce print head movement and thereby improve printing speed. An example is the IBM Personal Computer Graphics Printer. Many of these printers ignore white space even if that space is to be underscored. For these printers, the underscore subsection of PDT 31 would contain information to alert formatting program 27 that, if text data stream 28 requests the printing of a space, and if underscore is active, a modified set of print commands must be sent to the printer to force the printer to underscore the space. In other words, the processing of a space character depends on context (i.e., whether underscore is active or inactive). It should be noted that print functions other than space may also be context dependent.

If the system uses another printer, the operator merely constructs a second printer description table using information supplied by the support documentation for that printer.

After a specific printer description table is set up, and during subsequent printable data stream formatting, print formatting program 27 addresses PDT 31 as is shown schematically by segment anchor 42. Segment anchor 42 locates the appropriate table subsection by using the memory pointers in PDT header 36. For example, if segment anchor 42 is in search of a given general print command shell, PDT header 36 would direct segment anchor 42 to general subsection header 41 and thence to the requested printer description data 43 and the requested general print command shell 44. The selected information would then be transferred back to print formatting program 27 for further processing.

When formatting a printable data stream 29 from a text data stream 28, print formatting program 27 also uses information supplied by context control block 32. CCB 32 contains printer status information including, but not limited to, the present relative position between the printhead and the print media, the presence or absence of a sheet within the printer, and the condition of various flags including whether underscore, superscript, subscript, or boldface print are active or inactive. Also, CCB 32 contains emulation flags to indicate emulation should take place in the case of unrecognized print commands, or CCB 32 context flags that indicate that spaces should be conditioned differently in a specific context (e.g., underscore active). When determining which print command to select from PDT 31, formatting program 27 considers the current context stored in context control block 32 via line 46 as well as the next text commands appearing in text data stream 28. An example of this interaction is detailed below. During or after the completion of a particular task, print formatting program 27 may update the condition of context control block 32 via line 47. For example, if print formatting program 27 concatenates an "eject sheet" print command onto printable data stream 29, program 27 would update context control block 32 to indicate that there is no sheet present within the printer.

Figure 4:
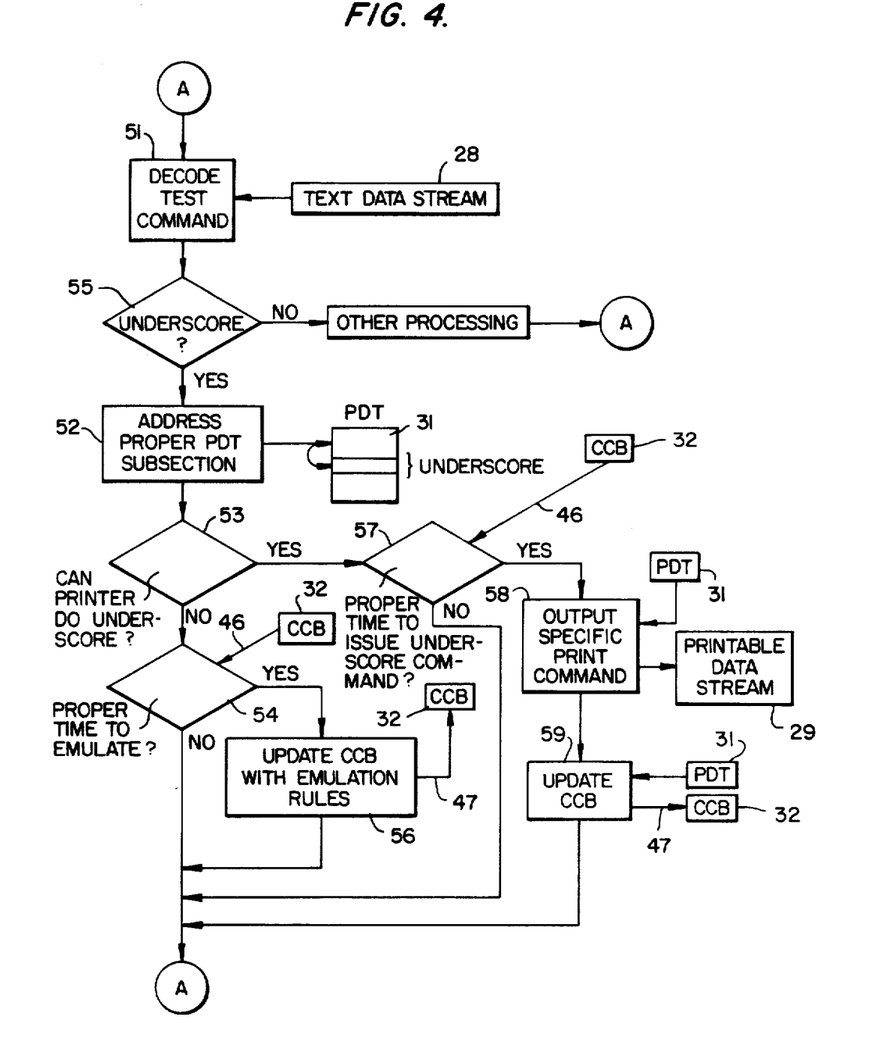
FIG. 4 is a control flow chart for performing automatic underscore according to this invention.
Figure 5:
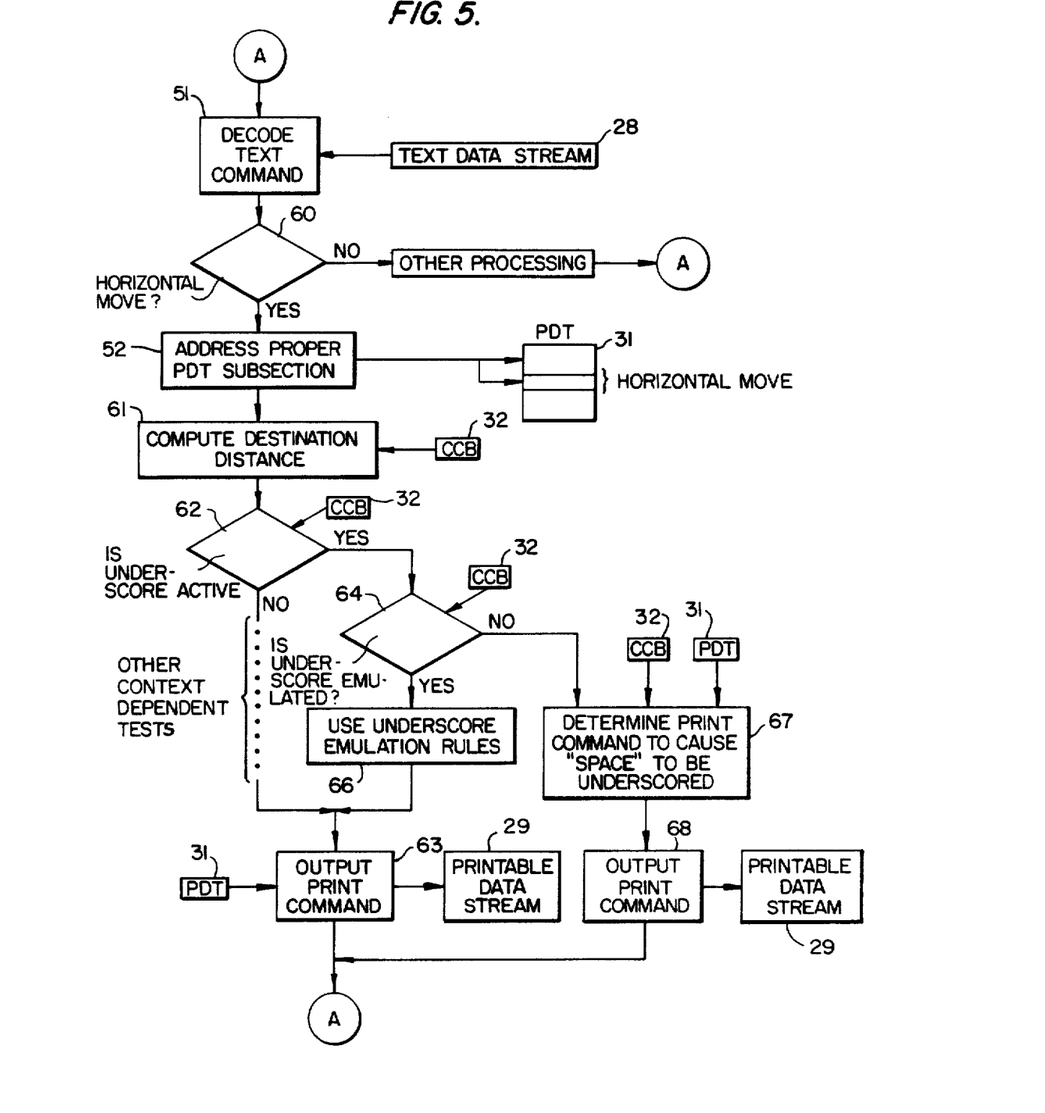
FIG. 5 is a control flow chart for performing a horizontal move according to this invention.

In order to better illustrate the operation of print formatting program 27, FIGS. 4-8 deal with specific examples. FIGS. 4 and 5 present flow diagrams demonstrating the operation of print formatting program 27 to underscore text according to the present invention. In FIG. 4, the text data stream contains an express command for "begin underscore", and in FIG. 5, the underscore subsection of the printer description table is addressed in addition to the "horizontal move" subsection even though the text command only requests "horizontal move".

Referring to FIG. 4, control begins at node A where operation block 51 decodes a text command from text data stream 28. Control is then transferred to decision block 55 to decide if "begin underscore" is requested. If the answer is "no", control is transferred to other decision blocks (not detailed) for command interpretation. If block 55 decides that "begin underscore" has been requested, control is transferred to operation block 52. Block 52 addresses the appropriate subsection for the "underscore" print command in PDT 31 and the result is reviewed by decision block 53. If PDT 31 indicates that the supported printer cannot perform underscore in response to a single print command, in other words, if the appropriate table header returned a null, control is transferred to decision block 54 where it is decided, by viewing CCB 32, if it is the proper time to emulate an underscore. If the decision of block 54 is negative, control is transferred back to node A to process the next individual text command. If the decision of block 54 is positive, control is transferred to operation block 56 where CCB 32 is updated with underscore emulation rules, and then control is transferred to node A to process the next text command.

If decision block 53 decides that the printer can perform an automatic underscore, control is transferred to decision block 57 which uses information from CCB 32 to decide if the time is right to issue a "begin underscore" print command. If the answer is "no" (e.g., if the printhead is not properly positioned), then control is transferred back to node A to process the next text command. If block 57 decides that it is the proper time to issue a "begin underscore" print command, control is transferred to operation block 58 where the specific print command for "begin underscore" (accessed earlier by block 52) is transferred from PDT 31 to printable data stream 29. Control is then transferred to operation block 59 where two operations occur. First, PDT 31 is addressed for context rules concerning specific underscore operation (for example, underscoring spaces) and the appropriate context flags are set in CCB 32. In addition, operation block 59 updates CCB 32 to indicate that automatic underscore is now active. When block 59 completes its operation, control is transferred back to node A for processing the next text command.

Although FIG. 4 illustrates that a printer can be commanded to begin underscoring in response to a "begin underscore" text command, it should be noted that, according to the present invention, a print command for "begin underscore" can be issued in response to other text commands. For example, FIG. 5 demonstrates how a "begin underscore" print command can be issued in response to a "horizontal move" text command.

Referring to FIG. 5, and again starting at node A as in FIG. 4, the next text command from text data stream 28 is decoded by block 51, recognized as a "horizontal move" command by block 60, and block 52 addresses PDT 31 for the print command "horizontal move."

Control is then transferred to operation block 61 which views information stored in CCB 32 to compute the distance to be moved in horizontal spaces. Control is then transferred to decision block 62 which addresses CCB 32 to see if printer underscore is active. If underscore is not active, control is transferred to other context dependent decision blocks (not shown) to sense if other printer functions are active, and eventually to operation block 63 where PDT 31 is addressed. Since underscore was not active according to block 62, a blank space print command is inserted into the printable data stream 29 and control returns to node A.

If decision block 62 decides that the printer underscore is active, control is transferred to decision block 64 where CCB 32 is addressed to decide if underscore is emulated. The emulation flag in CCB 32 may have been set, for example, by block 56 (FIG. 4). If the decision is "yes", control is transferred to operation block 66 where the emulation rules are activated. Control is then transferred to block 63 where PDT 31 is addressed and, this time, the emulation rules are used to place the appropriate print commands in print data stream 29.

If decision block 64 determines that underscore is not emulated, control is transferred to operation block 67 where the underscore subsection of PDT 31 is addressed to determine the print command for underscore. In addition, CCB 32 is addressed for context rules to assure the underscoring of spaces. Control is then transferred to operation block 68 where the underscore command is inserted into printable data stream 29 along with print commands for underscoring spaces and control is then transferred to node A for processing the next text command appearing in the text data stream.

Figure 6:
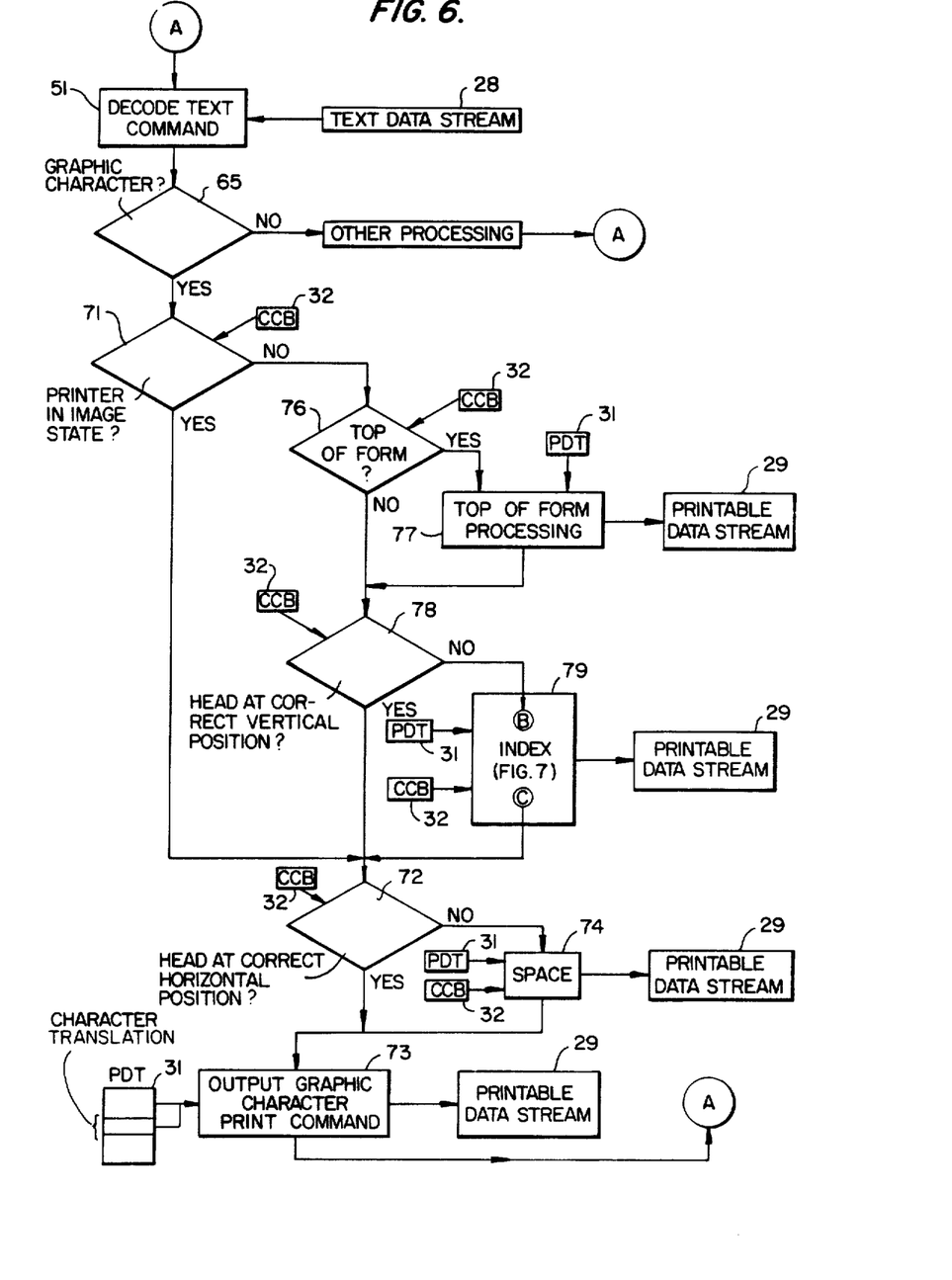
FIG. 6 is a control flow chart for printing a graphic character according to this invention.
Figure 7:
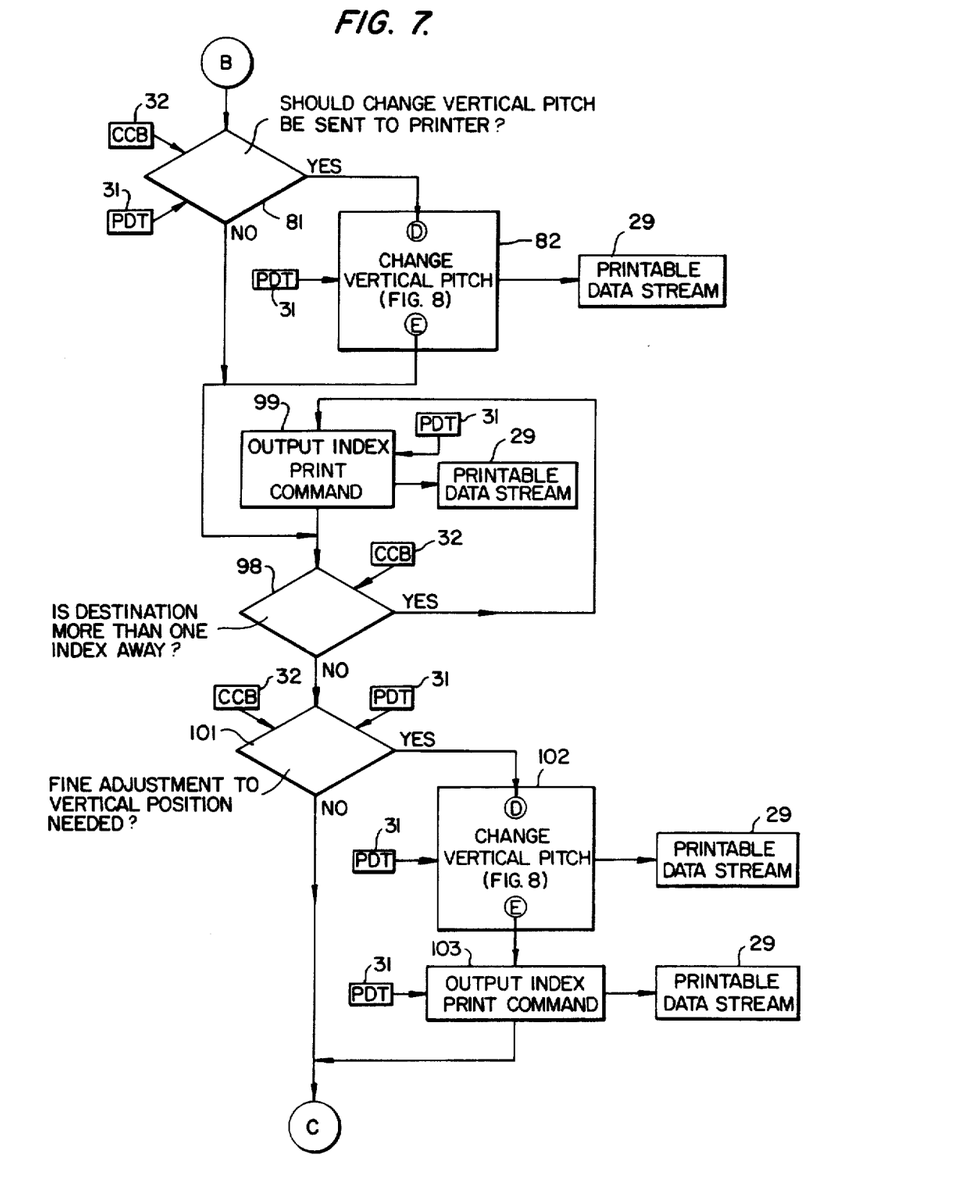
FIG. 7 is a control flow chart for indexing to a vertical position according to this invention.
Figure 8:
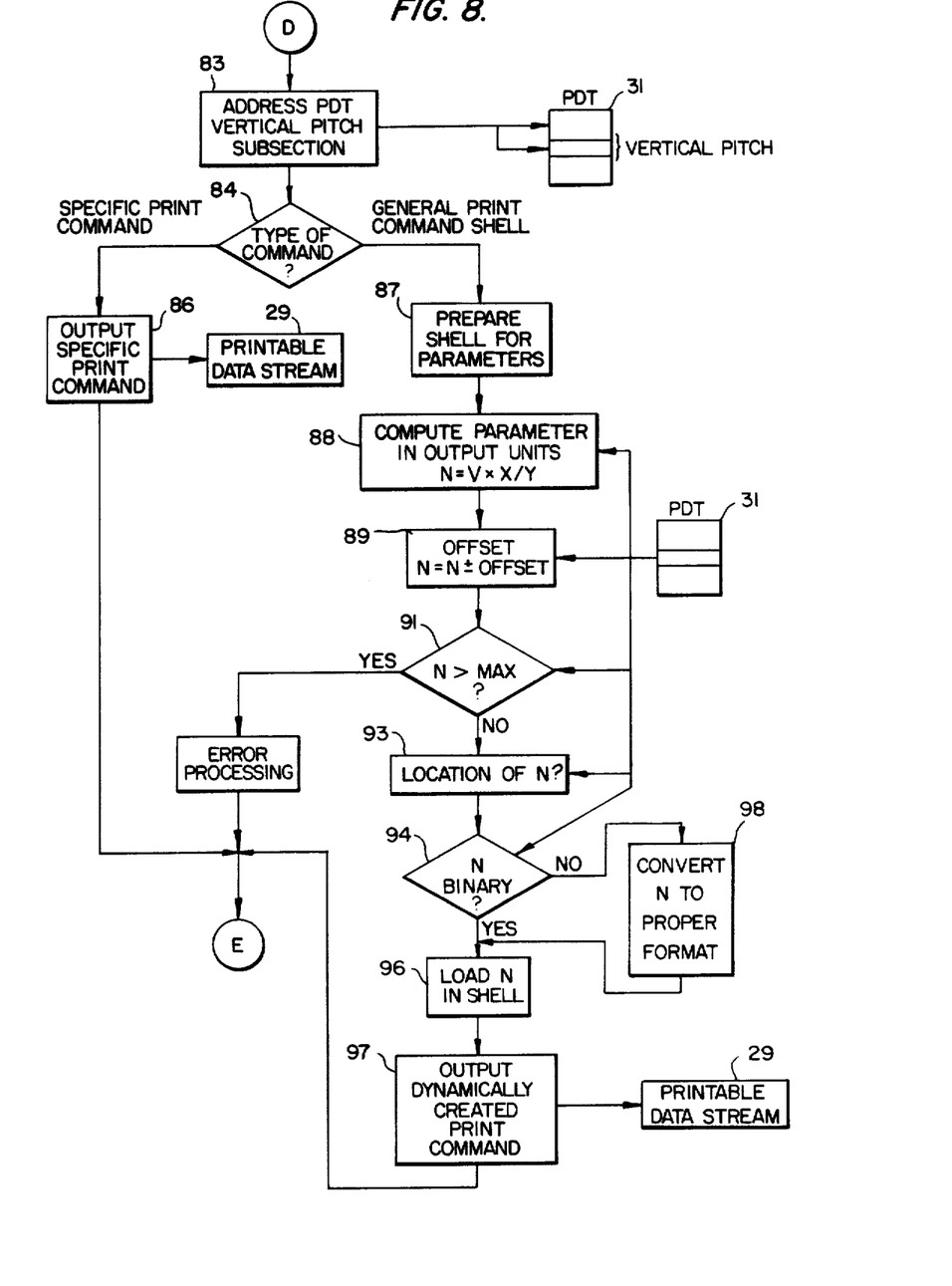
FIG. 8 is a control flow chart for changing vertical line pitch according to this invention.

FIGS. 6-8 illustrate an example of the flow of control of print formatting program 27 during the printing of a simple graphic character (e.g., "C"), including the dynamic calculation of parameters and insertion of parameters into general print command shells.

Beginning at node A, the next text command in text data stream 28 is decoded by operational block 51 and block 65 determines if a character is requested. Control is then transferred to decision block 71.

Decision block 71 interrogates CCB 32 to determine if the printer is in the image state indicating that the printer is ready to print a character, or whether the printer is in the non-image state indicating that certain mechanical functions must be performed before the printer is able to print a character.

If the printer is in the image state, control is transferred to decision block 72 which again interrogates CCB 32 to determine if the printhead is in the proper horizontal position. If the answer is "yes" control is transferred to operation block 73 where PDT 31 is addressed to select the proper print command for printing the requested graphic character. The selected print command is then transferred to printable data stream 29 and control is transferred back to node A to receive the next text command.

On the other hand, if decision block 72 decides that the print head is not at the proper horizontal position, control is transferred to operation block 74 which addresses both CCB 32 and PDT 31 to form the proper print command or sequence of print commands for insertion into printable data stream 29 to cause the printer to move the printhead to the proper horizontal position. Here it should be noted that the operation of block 74 may require the selection of specific print commands from PDT 31 as well as the dynamic creation of print commands from general print command shells also selected from PDT 31. In this regard, block 74 controlling horizontal spacing operates similar to block 79 (detailed below), which controls vertical index. Due to these similarities, only block 79 is detailed with the understanding that it is within the ability of a skilled artisan to modify the operation of index block 79 to perform the horizontal space function of block 74.

Returning now to the flow of control if decision block 71 decides that the printer is not in the image state, control is transferred to decision block 76 where CCB 32 is addressed to determine if the printer should be at the top of a form. If the decision is "yes", control is transferred to operation block 77 which addresses PDT 31 and which performs top of form processing including, for example, ejecting the present page, and feeding a new page. Block 77 concatenates the proper print commands onto data stream 29 to perform this top of form processing.

If block 76 decides that the printer is not at the top of a form, control is transferred to decision block 78 which addresses CCB 32 to decide if the printhead is in the proper vertical position. If block 78 decides "yes", control is transferred to block 72 and processing continues as detailed above. If block 78 decides that the printhead is not in the proper vertical position, control is transferred to block 79 to perform vertical indexing.

The details of the operation of block 79 appear in FIG. 7. Referring to FIG. 7, beginning at node B, control is transferred to decision block 81 where CCB 32 is addressed to decide if a "change line pitch" print command should be sent to the printer. For example, if present line pitch is 12 lines per inch and the new line pitch is 6 lines per inch, it may be better to simply issue two "index" print commands into the printable data stream rather than to change the present line pitch by issuing a "change line pitch" print command to change line spacing from 12 to 6 lines per inch followed by issuing an "index" print command. Decision block 81 may also decide that a "change line pitch" should not be sent if the appropriate header in PDT 31 returns a null memory pointer indicating that a change to the requested line pitch is not possible.

If block 81 decides that a "change line pitch" print command should be sent, control is transferred to operation block 82 where vertical line pitch is changed. The operation of block 82 is detailed in FIG. 8. Referring to FIG. 8, control begins at node D and is transferred to block 83 where the vertical line pitch subsection of PDT 31 is addressed. Control is then transferred to decision block 84 to decide if the print command needed to change to the requested vertical line pitch is determined by a specific print command or by a general print command shell. If a specific print command determines the print command needed to change to requested vertical line pitch, control is transferred to operation block 86 which outputs the specific print command for the requested vertical line pitch into printable data stream 29. Control is then transferred to node E and out of block 82 in FIG. 7.

If decision block 84 decides that a general print command shell is to be used to determine the print command needed to change to the requested vertical line pitch, control is transferred to operation block 87.

Operation block 87 prepares the selected general print command shell to receive the parameter or parameters to be calculated. For example, the selected shell is copied into a memory buffer. Control is then transferred to operation block 88.

Operation block 88 calculates the value of the parameter N using the length, in inches, of a new line (e.g., 1/6 inch for six lines per inch) supplied by the present requested value V as provided by a combination of text commands, multiplied by the size of the fundamental step in inches X/Y. Fundamental step X/Y is a printer description datum stored in PDT 31. Control is then transferred to operation block 89.

Operation block 89 increases or decreases the calculated parameter by any offsets required. In this regard, it is understood that subtracting an offset is equivalent to adding a negative offset and vice versa. Control is then transferred to decision block 91 where it is determined whether parameter N is greater than the specified maximum value for the parameter. If the answer is "yes" control is transferred to block 92 for error processing (not detailed). The offset and maximum value are also printer description data stored in PDT 31.

If decision block 91 decides that calculated parameter N is less than the specified maximum value, control is transferred to block 93 where the location of the parameter within the general sequence shell is computed. Parameter location is also stored in PDT 31.

Control is then transferred to decision block 94 where PDT 31 is addressed to determine if the printer expects parameter N to be in binary format. Heretofore, all calculations have been performed in binary format, therefore, parameter N is presently binary. If block 94 decides "yes" control is transferred to operation block 96 which loads binary parameter N into the selected general print command shell and operation block 97 outputs that shell, which is now a dynamically created print command for changing vertical line pitch, into printable data stream 29. If decision block 94 decides that the printer requires a format other than binary, control is transferred to operation block 98 where parameter N is converted into the proper format (e.g., ascii, hexadecimal, decimal, etc.). It should be noted that calculations can be performed using another internal format (e.g., packed decimal). If another internal format is used, the functions of decision block 94 and operation block 98 would be changed accordingly. After block 98 converts N to the proper format, control is then transferred to blocks 96 and 97 for loading the parameter in the shell and for outputting the loaded shell into printable data stream 29. After block 97 inserts the dynamically created print command into printable data stream 29, control is transferred to node E which places control at the output of block 82 in FIG. 7.

Referring again to FIG. 7, after block 82 releases control, control is transferred to decision block 98 which asks if the difference between the requested vertical position and present vertical position is greater than a single index step. If the answer is "yes", control is transferred to operation block 99 which addresses PDT 31 and then issues a specific "index" print command into printable data stream 29.

If decision block 98 decides that the requested vertical position is less than a single vertical index step, control is transferred to decision block 101 where it is determined if fine adjustment of vertical position is needed or if the appropriate printer description table header returned a null memory pointer indicating that fine adjustment is impossible. If fine adjustment is not needed or not possible, control is transferred to node C which places control at the output of block 79 in FIG. 6. Thereafter, control is transferred to decision block 72 in FIG. 6, and control continues as detailed earlier.

If decision block 101 determines that fine adjustment of vertical position is required, control is transferred to operation block 102 which again performs the change vertical pitch function detailed earlier with respect to FIG. 8. This may include generating a dynamically created print command to change line pitch and placing that command in printable data stream 29 as detailed above. Control is then transferred to operation block 103 which issues an index print command into data stream 29. Control is then transferred to node C of FIG. 7 which again places this at the output of block 79 in FIG. 6.

After block 79 of FIG. 6 adjusts the proper vertical position, and after block 72 determines that the proper horizontal position has been achieved, control is transferred to block 73 which addresses PDT 31 for the print command to print the originally requested graphic character which is then placed in printable data stream 29. Control is then transferred to node A which addresses the text data stream for the next text command.

The foregoing description with regard to FIGS. 6-8 illustrates the fact that the present formatting program invention performs many complex functions, and addresses PDT 31 and CCB 32 many different times during the processing of a text command requesting the printing of a simple graphic character.

I claim:

1. A word processing system for formatting a text data stream into a printable data stream of print commands to a printer including:
   a central processing unit, a keyboard device, a display device, a pritner, a memory device, and a print formatting program, wherein said text data stream is formatted into said printable data stream by said print formatting program, said memory device having means to store:
   a printer description table having at least one specific print command subsection and at least one general print command subsection;
   printer status data which contains information describing the capabilities of and particular conditions within said printer;
   said print formatting program having commands for selecting one of said print command subsections in response to said text data, said printer description table, and said printer status data, to place selected print commands into said printable data stream.

2. A word processing system as recited in claim 1 wherein said at least one of the general print command subsections includes a general print command shell which is an incomplete print command having empty positions for storage of one or more unspecified print command parameters.

3. A word processing system as recited in claim 1 wherein said printer description table further includes:
   a subsection header included in each said print command subsection, having memory pointers to individual print commands included in each print command subsection; and
   a table header having memory pointers to each subsection header.

4. A word processing system as recited in claim 3 wherein said table header includes null memory pointers for print command subsections not included in said table, and wherein each subsection header includes null memory pointers for print commands not included in the corresponding print command subsection.

5. A word processing system as recited in claim 1 wherein said print formatting program comprises:
   at least one general print command shell which is an incomplete print command having empty positions for storage of one or more unspecified print command parameters;
   commands for directing said central processing unit to construct at least one print command parameter by using text data and printer description data; and
   commands for loading said constructed print command parameter into selected one or more of said empty positions of said general print command shell to produce a print command.

6. A word processing system as recited in claim 5 wherein the commands directing the constructing of one parameter N is in accordance with the equation:

$$N = V \times X/Y$$

where:
V is a length supplied by said text data, and
X/Y is the length of a fundamental step performable by a printer controllable by said printable data stream.

7. A word processing system as recited in claim 6 wherein said print command controls the vertical line pitch of a printer controllable by said printable data stream.

8. A word processing system as recited in claim 7 wherein said print formatting program includes commands to add an offset to said parameter N.

9. A word processing system as recited in claim 6 wherein said print command controls the horizontal character pitch of a printer controllable by said printable data stream.

10. A word processing system as recited in claim 9 wherein said print formatting program includes commands to add an offset to said parameter N.

11. A word processing system as recited in claim 6 wherein said print formatting program includes commands to direct the central processing unit to load said parameter N into a selected general print command shell to produce a dynamically created print command and to place said dynamically created print command in said printable data stream.

12. A word processing system as recited in claim 5 wherein said print formatting program further includes:
   commands for storing at least one specific print command in said printer description table;
   commands for comparing said text data and said printer status data;
   commands for selecting at least one of said specific print command subsections based on the comparison of text data and printer status data;
   commands for placing said specific print command into said printable data stream.

13. A word processing system as recited in claim 6 wherein said print formatting program further includes:
   commands for selecting one of said general print command subsection based on said comparison;
   commands for constructing said parameter N and for loading said parameter into said general print command shell which has been selected to produce a dynamically created print command.

14. A method of formatting a printable data stream containing print commands from a text data stream comprising text commands and text data, including the steps of:

dividing a storage table in a memory into at least one specific print command subsection and at least one general print command subsection, each specific subsection including at least one print command and each general subsection including printer description data and a general print command shell which is an incomplete print command having empty positions for storage of one or more unspecified print command parameters which are to be subsequently calculated;

storing printer status data;

storing printer description data;

selecting one of said print command subsections in response to said text data, said printer status data and said printer description data;

placing a particular print command in said printable data stream when a specific print command has been selected;

constructing a parameter using said text data and said printer description data when a general print command has been selected;

loading said parameter into said general print command shell to produce a dynamically created print command; and placing said dynamically created print command into said printable data stream.

* * * * *